Patented Sept. 6, 1938

2,129,190

UNITED STATES PATENT OFFICE 2,129,190

PAPER PROPAGATING POT

Martin Leatherman, Hyattsville, Md., dedicated to the free use of the People of the United States of America No Drawing. Application February 24, 1938, Serial No. 192,346

5 Claims. (Cl. 47—37)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the People of the United States of America to take effect on the granting of a patent to me.

This invention relates to a treatment for paper pots such as may be used for propagating plant seedlings of various kinds. Propagating pots made of paper possess many advantages over those made of pottery, metal or other materials. Some of these advantages are lower cost, light weight, low transportation costs, economy in space both in shipping and in use because of thin walls, and unbreakability. In spite of these advantages, paper pots have not found great favor with plant propagators in the past for reasons which my invention is intended to obviate. The chief disadvantage of paper pots as heretofore used is that untreated paper is readily attacked by microorganisms whose activities hinder growth of the plant by depleting the available source of nitrogen in the soil. Also these microorganisms soon completely destroy the pot. On the other hand, if the paper is waterproofed, which is a common practice designed to inhibit the action of microorganisms, it becomes very difficult to insure the growing plant with enough water because the small amount of soil contained in the pot dries out very rapidly. Clay pots are pervious to water, and when imbedded in soil permit moisture to travel from the surrounding soil into the interior of the pot. This fact explains the very favorable growth made by plants in clay pots. However, clay pots are costly, heavy, bulky and breakable.

I have discovered that it is possible to secure the same favorable results with paper pots as with clay pots in the growing of plants, if the paper is impregnated with copper resinate. With this treatment the action of microorganisms is inhibited. The pot can be imbedded in soil without the paper being destroyed by microorganisms, and yet the surrounding soil moisture can travel freely into the pot, thus insuring the growing plant against moisture deficiency. My invention possesses the further unique advantage in that the treatment of the paper walls of the pot with copper resinate actually exerts a stimulating action on the growth of certain plants, such as tomato plants.

My invention can be utilized in various ways more fully shown in the examples hereinafter given.

The most convenient method of treating paper pots is to dissolve the copper resinate, which has preferably been prepared by precipitation, in a volatile solvent such as carbon tetrachloride or mineral spirits, and then dip the pots (or the paper from which the pots are to be made) in the solution, thereafter allowing the solvent to evaporate. The concentration of copper resinate needed to give a light or a heavy treatment to the paper will depend to a large extent upon the character of the paper of which the pot is made. In the case of paper made of newsboard, sixteen-thousandths of an inch thick, a solution of one part of copper resinate in twenty-four parts of carbon tetrachloride by weight gives a relatively heavy impregnation, whereas with a parchmentized paper this strength of solution gives only a light impregnation.

The percentage of copper resinate best suited will in some cases depend upon the acidity of the soil, as well as the kind of paper used.

The following examples show the results of experiments conducted under my direction at the greenhouses of the Arlington Experimental Farm of the United States Department of Agriculture, using a total of 2,200 Marglobe tomato seedlings. Two hundred of these seedlings were used for each example and they were allowed to develop for a period of thirty-eight days.

*Example 1.*—The tomato seedlings were transplanted in untreated pots made of uncalendered newsboard, sixteen-thousandths of an inch thick. These plants attained an average weight of 3.57 grams above ground.

*Example 2.*—The seedlings were transplanted in the same kind of pots as in Example 1, except that the pots in this case were impregnated with 2.50 percent by weight of copper resinate. In this case, the plants attained an average weight of 3.63 grams above ground.

*Example 3.*—Same as Example 2, except the pots were impregnated with 4.34 percent by weight of copper resinate instead of 2.50 percent. The average plant yield in this case was 5.64 grams above ground.

*Example 4.*—Same as Example 2, except that the pots were impregnated with 6.41 percent by weight of copper resinate. This, however, gave an average plant yield of only 4.07 grams above ground.

*Example 5.*—In this case, pots like those in the previous examples were first perforated and then impregnated with 13.6 percent by weight of copper resinate. The average growth of the plants above ground in this case was 5.91 grams.

*Example 6.*—In this case, untreated heavily calendered cups gave an average plant yield of 5.20 grams above ground.

*Example 7.*—Drinking cups like those in Example 6 were treated with 1.36 percent of copper resinate by weight and the plants attained an average weight above ground of 6.60 grams.

Other commercial pots used in the experiment produced average plant yields above ground ranging from 3.25 grams to 4.72 grams.

All of the above experiments were conducted under substantially the same environmental conditions.

Explanation

In Example 1, the pots not only yielded smaller growths of plants but at the end of the experiment, they were considerably disintegrated.

In Example 2, the condition of the pots was practically the same as in Example 1, and the yield was not substantially different for practical purposes.

In Example 3, the average yield was 2.07 grams higher than in the untreated pot or approximately 58 percent higher. Also the condition of the pots at the end of the experiment showed much less disintegration than in Examples 1 and 2.

In Example 4, an increased concentration of copper resinate gave a smaller yield due to the fact that the pots were almost completely waterproof, while in Example 5, with a still greater percentage of copper resinate but with the pots perforated, a yield was obtained greater than in any of the Examples 1, 2, 3, or 4. This shows that it is not desirable to increase the percentage of copper resinate much higher than 4.34 percent without perforating the pots when using the materials in those examples. The optimum percentage of copper resinate is probably about 4.5 percent or some percentage between 4 and 5 for unperforated pots of this kind considering the yield of the perforated pots in Example 5 a maximum.

Examples 6 and 7 show a marked increase in yield using only a small percentage of copper resinate, namely, 1.36 percent. The average increase in yield was 1.40 grams or approximately 27 percent.

The examples of the commercial pots also show distinct advantages of the present invention, since yields obtained with these commercial pots were in no case higher than the yield obtained in Examples 3, 5, and 7, and in many cases were even below that obtained with the untreated pots in Examples 1 and 6.

Having thus described my invention, I claim:

1. An article of manufacture consisting of a plant propagating paper pot impregnated with copper resinate.

2. An article of manufacture consisting of a perforated plant propagating paper pot impregnated with copper resinate.

3. The method of waterproofing and preserving plant propagating paper pots, which method comprises impregnating said pots with copper resinate.

4. The method of waterproofing and preserving plant propagating paper pots, which method comprises impregnating said pots with copper resinate dissolved in a volatile solvent and then allowing said solvent to volatilize.

5. An article of manufacture comprising a plant propagating pot of uncalendered newsboard impregnated with approximately 4 to 5 percent of copper resinate by weight.

MARTIN LEATHERMAN.